United States Patent
Hhiue

(10) Patent No.: US 6,840,547 B2
(45) Date of Patent: Jan. 11, 2005

(54) ROTATABLE CONNECTION ASSEMBLY FOR FLEXIBLE HOSES

(76) Inventor: Andy Hhiue, No. 70, Singda Rd., South District, Taichung City 402 (TW)

( * ) Notice: Subject to any disclaimer, the term of this patent is extended or adjusted under 35 U.S.C. 154(b) by 60 days.

(21) Appl. No.: 10/460,367

(22) Filed: Jun. 13, 2003

(65) Prior Publication Data
US 2004/0251680 A1 Dec. 16, 2004

(51) Int. Cl.⁷ .............................................. F16L 27/00
(52) U.S. Cl. ..................... 285/272; 285/278; 285/222.1
(58) Field of Search ..................... 285/8, 148.4, 222.1, 285/272, 278, 354

(56) References Cited

U.S. PATENT DOCUMENTS

| | | | | |
|---|---|---|---|---|
| 1,830,674 A | * | 11/1931 | Peck | 285/101 |
| 2,476,480 A | * | 7/1949 | Burckle et al. | 285/222.1 |
| 2,544,764 A | * | 3/1951 | James | 285/348 |
| 2,578,933 A | * | 12/1951 | Hunter et al. | 285/8 |
| 2,584,044 A | * | 1/1952 | Leonard et al. | 285/8 |
| 2,973,975 A | * | 3/1961 | Ramberg et al. | 285/222.1 |
| 4,343,498 A | * | 8/1982 | Campanini | 285/148.15 |
| 5,024,419 A | * | 6/1991 | Mulvey | 251/148 |
| 5,553,893 A | * | 9/1996 | Foti | 285/147.1 |

* cited by examiner

Primary Examiner—James M. Hewitt
(74) Attorney, Agent, or Firm—Rosenberg, Klein & Lee

(57) ABSTRACT

A connection assembly for flexible hoses includes a base tube having a first through passage and a threaded section of a connection nut is fixed to the first through passage. The connection nut has a connection section which extends beyond the first passage and a connection nut having a second through passage is mounted to the connection section. A sleeve has its first end fixedly mounted to the connection nut and the connection nut can be freely rotatable on an end surface of the base tube. An end of a flexible hose is fixedly received in the sleeve and the other end of the flexible hose extends through an enlarged opening in a second end of the sleeve.

3 Claims, 4 Drawing Sheets

ROTATABLE CONNECTION ASSEMBLY FOR FLEXIBLE HOSES

FIELD OF THE INVENTION

The present invention relates to a rotatable connection assembly for connecting a flexible hose so as to reduce the bending stress and/or torsion stress to the flexible hose.

BACKGROUND OF THE INVENTION

A conventional flexible hose connected with a faucet or the like generally has a first end which is threadedly connected to the faucet a second end of the hose is connected with a nozzle so that the user may pull the hose to desired point and proceed cleaning work by the water. This is a convenient design for the users to reach the nozzle to desired positions. When in use, the flexible hose could be rotated an angle relative to the fixed first end, or the flexible hose could be bent an angle relative to the fixed first end. Bending stress and/or torsion stress are applied to the connection portion at the first end of the flexible hose so that the connection portion of the hose could crack. Once there is a crack in the flexible hose, the whole hose has to be discarded and a new hose is to be purchased.

The present invention intends to provide a rotatable connection assembly for connecting a flexible hose. The hose can be freely rotated and bent so as to improve the shortcomings of the conventional hose connection assembly.

SUMMARY OF THE INVENTION

In accordance with one aspect of the present invention, there is provided a connection assembly for flexible hoses and comprises a base tube having a first through passage defined therethrough and a connection tube has a threaded section which threadedly connected to the first passage of the base tube, and a connection section to which a connection nut is mounted. A sleeve has a first end fixedly mounted to the connection nut and an enlarged opening is defined in a second end of the sleeve. A flexible hose has one end fixedly received in the sleeve and the other end of the flexible hose extends through the enlarged opening of the sleeve.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
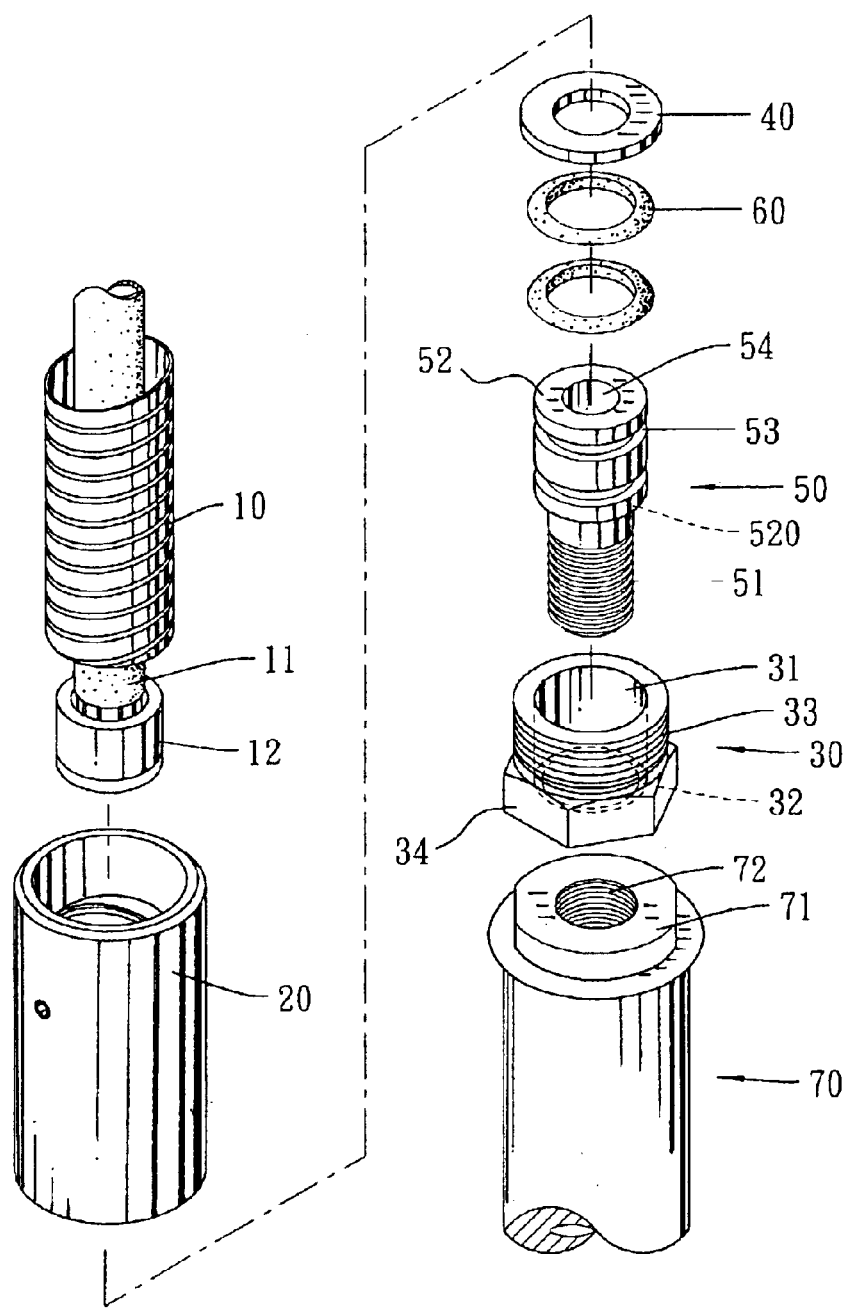
FIG. 1 is an exploded view to show a rotatable connection assembly for connecting a flexible hose of the present invention.
Figure 2:
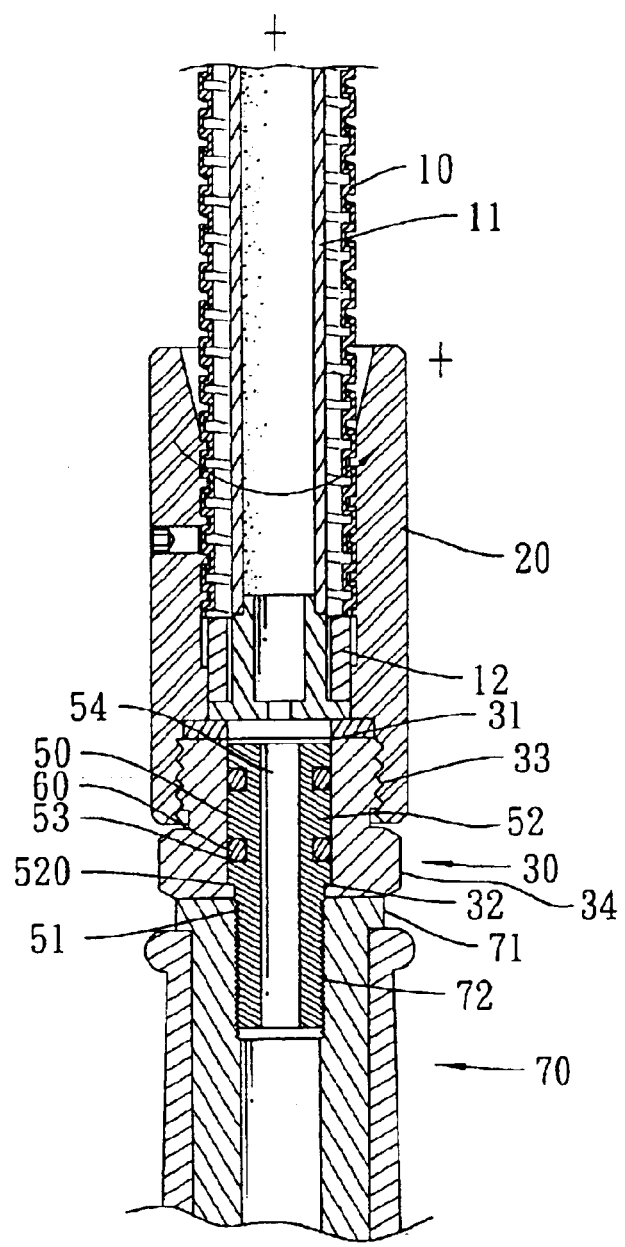
FIG. 2 is a cross sectional view of the connection assembly of the present invention.
Figure 3:
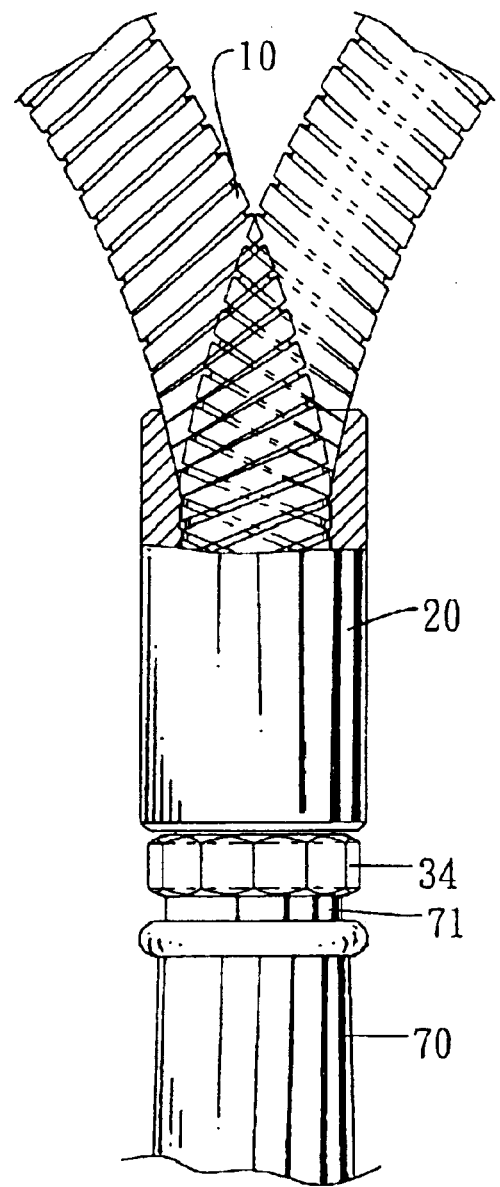
FIG. 3 shows that the flexible hose can be curved and rotated relative to the base tube.
Figure 4:
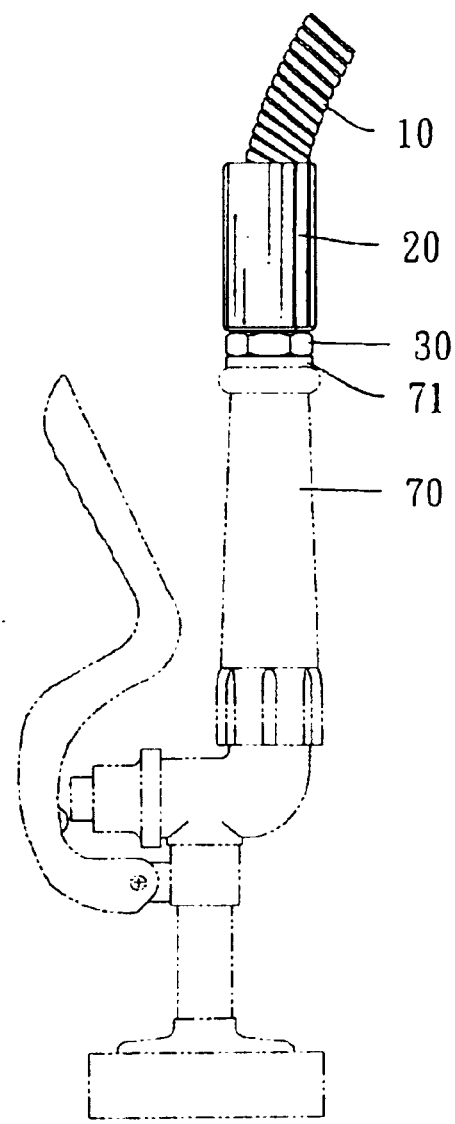
FIG. 4 shows the rotatable connection assembly for connecting a flexible hose of the present invention is connected to a faucet.

Referring to FIGS. 1 to 4, the connection assembly for flexible hoses of the present invention comprises a base tube 70 which has one end fixed to a faucet as shown in FIG. 4 and a protrusion 71 extends from the other end of the base tube 70.

A first through passage 72 is defined through the base tube 70.

A connection nut 30 has a second through passage 31 defined therethrough and a flange 32 extends from an inner periphery of the second through passage 31. The connection nut 30 has a threaded outer periphery 33 and a polygonal flange 34 which is convenient for the user to rotated by a spanner or the like.

A connection tube 50 has a threaded section 51 and a connection section 52. The threaded section 51 is threadedly connected to an inner threaded portion in the first through passage 72 of the base tube 70 and the connection section 52 is rotatably engaged with the second through passage 31 of the connection nut 30. A step shoulder 520 is defined in an end of the connection section 52 and the step shoulder 520 is engaged with the flange 32. The connection section 52 of the connection tube 50 includes grooves 53 defined in an outer periphery thereof and seals 60 are engaged with the grooves 53 so that water will not leak from the second through passage 31. A third through passage 54 is defined through the connection tube 50 and communicates with the first through passage 72. The connection nut 30 is rotatably rested on an end surface of the protrusion 71 on the base tube 70.

A sleeve 20 has a first end threadedly connected to the threaded outer periphery 33 of the connection nut 30 and an enlarged opening defined in a second end of the sleeve 20.

A flexible hose 11 has an outer sheath 10 and one end of the flexible hose 11 is connected to a connection end 12 which is fixedly received in the sleeve 20 and the other end of the flexible hose 11 extending through the enlarged opening of the sleeve 20.

The hose 11 and the sleeve 20 can be rotatable relative to the base tube 70 so that the user can conveniently rotate the hose 11 during use and no torsion stress is applied to the hose 11. The enlarged opening of the sleeve 20 allows the hose 11 to have large range to be bent so as to reduce the bending stress applied to the hose 11.

While we have shown and described the embodiment in accordance with the present invention, it should be clear to those skilled in the art that further embodiments may be made without departing from the scope of the present invention.

What is claimed is:

1. A connection assembly for flexible hoses, comprising:
    a base tube having a first through passage defined therethrough;
    a connection nut having a second through passage;
    a connection tube having a threaded section and a connection section, the threaded section threadedly connected to an inner threaded portion in the first through passage of the base tube and the connection section rotatably engaged with the second through passage of the connection nut, a third through passage defined through the connection tube and communicating with the first through passage, the connection nut rotatably rested on an end surface of the base tube;

a sleeve having a first end fixedly mounted to the connection nut and an enlarged opening defined in a second end of the sleeve, and a flexible hose having one end fixedly received in the sleeve and the other end of the flexible hose extending through the enlarged opening of the sleeve.

2. The connection assembly for flexible hoses as claimed in claim 1, wherein a flange extends from an inner periphery of the second through passage and a step shoulder is defined in an end of the connection section, the step shoulder engaged with the flange.

3. The connection assembly for flexible hoses as claimed in claim 1, wherein the connection section of the connection tube includes grooves defined in an outer periphery thereof and seals are engaged with the grooves.

* * * * *